(12) United States Patent
Pawlik et al.

(10) Patent No.: US 9,205,630 B2
(45) Date of Patent: Dec. 8, 2015

(54) HYBRID COMPONENTS WITH REACTIVE HOTMELT ADHESIVES

(75) Inventors: Andreas Pawlik, Recklinghausen (DE); Martin Risthaus, Olfen (DE); Jochen Fritz, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 257 days.

(21) Appl. No.: 13/322,673

(22) PCT Filed: Mar. 31, 2010

(86) PCT No.: PCT/EP2010/054270
§ 371 (c)(1),
(2), (4) Date: Nov. 28, 2011

(87) PCT Pub. No.: WO2010/136241
PCT Pub. Date: Dec. 2, 2010

(65) Prior Publication Data
US 2012/0070670 A1    Mar. 22, 2012

(30) Foreign Application Priority Data

May 27, 2009  (DE) .................. 10 2009 026 493
Jun. 17, 2009  (DE) .................. 10 2009 026 988

(51) Int. Cl.
| | | |
|---|---|---|
| *B32B 7/12* | (2006.01) | |
| *B32B 15/08* | (2006.01) | |
| *C09J 5/06* | (2006.01) | |
| *C09J 177/00* | (2006.01) | |
| *C09J 177/02* | (2006.01) | |
| *B29C 65/00* | (2006.01) | |
| *B29K 305/00* | (2006.01) | |
| *B29L 31/30* | (2006.01) | |
| *C08L 51/06* | (2006.01) | |
| *C08L 63/00* | (2006.01) | |
| *B29C 65/48* | (2006.01) | |

(52) U.S. Cl.
CPC . *B32B 7/12* (2013.01); *B32B 15/08* (2013.01); *C09J 5/06* (2013.01); *C09J 177/00* (2013.01); *C09J 177/02* (2013.01); *B29C 65/483* (2013.01); *B29C 65/4815* (2013.01); *B29C 65/4865* (2013.01); *B29C 66/742* (2013.01); *B29K 2305/00* (2013.01); *B29L 2031/30* (2013.01); *B29L 2031/3076* (2013.01); *C08L 51/06* (2013.01); *C08L 63/00* (2013.01); *C09J 2400/163* (2013.01); *C09J 2423/00* (2013.01); *C09J 2477/00* (2013.01); *Y10T 428/31522* (2015.04)

(58) Field of Classification Search
CPC .. B32B 15/08; B32B 7/12; Y10T 428/31522; C29C 65/4815; C29C 65/483; C29C 65/4865; C29C 66/742; B29K 2305/00; B29L 2031/30; B29L 2031/3076; C08L 51/06; C08L 63/00; C08L 2666/02; C09J 177/00; C09J 177/02; C09J 5/06; C09J 2423/00; C09J 2477/00
See application file for complete search history.

(56) References Cited

U.S. PATENT DOCUMENTS

| | | | | |
|---|---|---|---|---|
| 6,589,606 | B2 * | 7/2003 | Waterkamp et al. | 427/458 |
| 6,861,464 | B2 * | 3/2005 | Eadara et al. | 524/502 |
| 7,951,260 | B2 | 5/2011 | Risthaus et al. | |
| 2004/0220320 | A1 * | 11/2004 | Abhari et al. | 524/487 |
| 2007/0163709 | A1 * | 7/2007 | Risthaus et al. | 156/327 |
| 2009/0159206 | A1 * | 6/2009 | Wang | 156/331.7 |
| 2011/0143142 | A1 | 6/2011 | Risthaus et al. | |

FOREIGN PATENT DOCUMENTS

| | | |
|---|---|---|
| DE | 1 225 081 | 9/1966 |
| EP | 1 808 468 | 7/2007 |
| WO | 2005 061203 | 7/2005 |

OTHER PUBLICATIONS

International Search Report Issued Jul. 29, 2010 in PCT/EP10/054270 Filed Mar. 31, 2010.

* cited by examiner

*Primary Examiner* — Callie Shosho
*Assistant Examiner* — John Freeman
(74) *Attorney, Agent, or Firm* — Oblon, McClelland, Maier & Neustadt, L.L.P.

(57) ABSTRACT

A description is given of the use of reactive hotmelt adhesives based on copolyamide and further comprising isocyanate and epoxide and also a functionalized polyolefin in hybrid components. These hybrid components find applications in vehicle construction and in aircraft construction, for example.

13 Claims, No Drawings

HYBRID COMPONENTS WITH REACTIVE HOTMELT ADHESIVES

CROSS-REFERENCE TO RELATED APPLICATIONS

This application is a National Stage of PCT/EP2010/054270 filed on Mar. 31, 2010. This application is based upon and claims the benefit of priority to German Application No. 10 2009 026 493.0 filed on May 27, 2009, and to German Application No. 10 2009 026 988.6 filed on Jun. 17, 2009.

BACKGROUND OF THE INVENTION

The notification of invention describes the use of reactive hotmelt adhesives in structural components. Structural components are components with subordinate aesthetic requirements which are employed in the construction both of vehicles and of aircraft in the area of load-bearing parts and of force-accommodating parts and which are notable in particular for the local reinforcements they have, which give the component particular mechanical properties. Particularly noteworthy is the increase in torsional rigidity with additional weight reduction as compared with existing components.

The hybrid components described in this notification of invention are notable in particular for the fact that they are composed of an assembly of principally metals with polymers. Here, a polymer structure is inserted by means of injection molding techniques into a metal component, and gives the component the appropriate torsional rigidity and crash rigidity in addition to comparatively low weight.

The weak point in these hybrid components described has hitherto been the attachment of the polymer to the metallic material. Here, as a result of contraction and of differences in coefficients of expansion between the various materials, disbonding of the components occurs, leading to a deterioration in the mechanical properties. At the present time, structure-forming hybrid components are produced by injection-molding a polymeric material into a metallic material. The problem with this physical join is the transition between the polymer and the metal, since the materials have different mechanical properties, leading to an adverse effect on the strength of the assembly, as a result of shrinking of the polymer, for example, and hence an adverse effect on the torsional rigidity of the components as well.

EP1808468 to Evonik Degussa GmbH describes a substantially better attachment of the two components, through preliminary coating of the metallic component with constructive hotmelt adhesives based on laurolactam, and an improved corrosion resistance on the part of the hybrid components. This effect can be improved further if blocked isocyanates which have a constructive effect in terms of molecular weight, and also epoxides, which have adhesion-promoting and crosslinking effects, are added additionally to the hotmelt adhesive used. The increase in molecular weight is required as a result of the cathodic electrodeposition coating (cathodic electrocoat) needed for the component for reasons of corrosion control, since the residence time of more than 25 minutes after electrodeposition coating at above 150° C. generates the increased strength of cohesion and strength of adhesion that are needed for these components. Purely thermoplastic hotmelt adhesives would already undergo thermal degradation at the stated temperature loads and hence adversely affect the mechanical properties of the component. The hotmelt adhesive described displays generally very good affinities to metallic materials, and in the hybrid components is employed as an adhesion promoter between the metal and the polymer.

According to EP1808468, the reactive hotmelt adhesive used also improves the corrosion resistance, by compensating differences in shrinkage between the metallic material and the injection molding materials, and thereby preventing the formation of corrosion-susceptible cracks.

The primer system described in EP1808468 works particularly in the case of polar injection molding materials such as polyamide 6 or 66. In the case of nonpolar injection molding materials, whose incidence is on the increase, such as polypropylene reinforced with long glass fiber, for example, the difference in polarity portends inadequate adhesion. In the case of hybrid components with nonpolar injection molding materials of these kinds, moreover, there is no cathodic electrocoat treatment, and so the increased strength of cohesion and adhesion achievable as a result of the cathodic electrocoat conditions disappear. The object, therefore, was to develop an adhesion promoter system which fulfills good adhesion to polyolefin injection molding materials even without cathodic electrocoat treatment (more than 25 minutes after electrodeposition coating at above 150° C.).

It has now surprisingly been found, in accordance with the claims, that the addition of functionalized polyolefins to the copolyamide-based reactive adhesives described in EP1808468, additionally comprising isocyanate and epoxide, achieves this object.

For this purpose, the powder mixing systems described in EP1808468, based on a laurolactam-containing copolyamide with a fraction of 2.5% to 15%, preferably 4% to 6%, of a blocked isocyanate and also 2.5% to 10%, preferably 4% to 7.5%, more preferably 4% to 6% of an epoxide, are additionally admixed with 10% to 60%, preferably 20% to 50%, of a functionalized polyolefin powder. In principle it is possible to use the powder mixtures described in coating formulations as well.

The functionalized polyolefin is in the simplest case polypropylene-based. Also suitable, however, are ethylene/$C_3$ to $C_{12}$ α-olefin copolymers. As a $C_3$ to $C_{12}$ α-olefin use is made, for example, of propene, 1-butene, 1-pentene, 1-hexene, 1-octene, 1-decene or 1-dodecene. The ethylene/$C_3$ to $C_{12}$ α-olefin copolymers may also, furthermore, contain up to a maximum of about 10% by weight of olefin dienes such as ethylidene-norbornene or 1,4-hexadiene, for example. For functionalization, preference is given to acid anhydride moieties, which are introduced in a known way by means of thermal or free-radical reactions of the main-chain polymer with an unsaturated dicarboxylic anhydride or an unsaturated dicarboxylic acid. Suitable reagents are maleic anhydride or itaconic anhydride, for example. In this way, 0.1% to 4% by weight is grafted on, and this may also take place together with a further monomer such as styrene, for example.

Polyolefins grafted with maleic acid have found widespread use for industrial applications, particularly for high-impact modifications or as compatibilizers in blends and mechanically reinforced systems (Polymer, 2001, 42, 3649-3655 and literature cited). Said source describes by way of example the preparation of polyolefins with this kind of functionalization as well.

One typical representative of a functionalized polyolefin is the polypropylene-based, acid anhydride-grafted Admer QB 520 E (Mitsui Chemicals). Also suitable for use in principle are more readily flowing polypropylenes, grafted with maleic acid, from the company Kometra (e.g., SCONA TPPP 8012).

A further possibility for functionalization lies in the melt mixing of unfunctionalized polyolefins with reactive compatibilizers which contain epoxide moieties or carboxylic anhydride moieties. Typical examples are copolymers consisting of ethylene, one or more nonreactive acrylic monomers with maleic anhydride or glycidyl methacrylate.

The modified polyolefin component is used preferably in ground form in the reactive hotmelt adhesive powder mixture. In principle, however, it is also possible to mix the copolyamide component with the functionalized polyolefin in the melt, then to carry out grinding and to combine the ground component with powder of epoxide and of isocyanate.

A feature of the application process is that a metal profile is first coated partially or over its full area with a copolyamide hotmelt adhesive, by means of electrostatic spray gun and/or via a suitable painting system, and then is heated to about 150° C. over a period of 120 to 300 seconds, preferably around 150 seconds, in order to initiate melting of the adhesive. As the following step, a polymer structure is injection-molded in.

The hybrid components of the invention find application in vehicle construction, in the air travel industry, in railroad construction, etc.; a typical application is encountered in the area of front ends (bumpers) or roof frame.

EXAMPLE

A typical example of a powder mixture has the following composition:

45% VESTAMELT X1027

7.5% VESTAGON BF 1320

7.5% Araldit GT7004

40% Admer QB 520 E

In the first step, the ingredients were each cold-ground in an Alpine pinned-disk mill, fractionated using a Sweco air jet sieve (particle size band up to 80 μm) and combined by means of a Diosna high-speed mixer.

Using an electrostatic spray gun, U-shaped steel panels were then coated with the reactive powder mixture and treated at 150° C. for 150 seconds.

The metal parts ought to be degreased prior to coating in order to have even surfaces and to minimize any scatter in the adhesion values. Moreover, preheating of the metal parts at 60 to 80° C. is advantageous for wetting.

Lastly, hybrid components were produced on a KrausMaffei injection-molding machine (model LM125-390-160CZ), using Stamax 30YM240 (PP-LGF30 from Sabic) as the plastics component for injection molding. As a comparison, hybrid components with uncoated metal panels were produced as well.

Torsional experiments were then carried out on the hybrid components obtained (test equipment: rotation cylinder from Schenck, type PD1F, manufacturing No. 1PKT2920 with torque transducer type PM1 DF, $M_{max}$=1 kNm, angle transducer type PDF, Mat. No.: P202039.01, nominal measuring angle 100°, control electronics from Schenck, type S59). Loading took place with an angular velocity of 1.5°/s up to a maximum turning angle of approximately 90°. The rigidity represented was determined by means of a linear regression of the torque/turning angle characteristics between 5 Nm and 50 Nm. The comparison below shows the massive improvement in the mechanical properties through use of the primer system of the invention (3 specimens were used in each case):

Uncoated Hybrid Component:

| Designation of specimen | Max. torque [Nm] | Turning angle at $M_{max}$ [°] | Rigidity between 5-25 Nm [Nm/°] |
| --- | --- | --- | --- |
| 1 | 70.1 | 21.7 | 6.1* |
| 2 | 74.7 | 21.8 | 6.6* |
| 3 | 69.0 | 21.2 | 4.5* |

Coated Hybrid Component:

| Designation of specimen | Max. torque [Nm] | Turning angle at $M_{max}$ [°] | Rigidity between 5-50 Nm [Nm/°] |
| --- | --- | --- | --- |
| 4 | 87.4 | 12.5 | 13.7 |
| 5 | 81.6 | 13.9 | 11.8 |
| 6 | 85.8 | 19.0 | 13.9 |

The invention claimed is:

1. A process for producing a hybrid component, the process comprising joining a metal component to a polyolefin component with a copolyamide-based hotmelt adhesive comprising a copolyamide, a blocked isocyanate, an epoxide, and a functionalized polyolefin, said process not comprising a cathodic electrocoat treatment,
wherein the hotmelt adhesive comprises 2.5% to 15% of the blocked isocyanate and 2.5% to 10% of the epoxide,
wherein the hotmelt adhesive comprises 10% to 60% of the functionalized polyolefin, and
wherein the functionalized polyolefin is functionalized with at least one acid anhydride moiety.

2. The process of claim 1, wherein the copolyamide is based on laurolactam.

3. The process of claim 2, wherein the hotmelt adhesive comprises 4% to 6% of the blocked isocyanate and 4% to 7.5% of the epoxide.

4. The process of claim 2, wherein the functionalized polyolefin is based on polypropylene, ethylene and at least one $C_3$ to $C_{12}$ α-olefin copolymer.

5. The process of claim 2, wherein
the metal component is partially or entirely coated with the hotmelt adhesive,
coating occurs with an electrostatic spray gun, a painting system, or both, and
the metal component is heated at 150° C. for between 120 to 300 seconds.

6. An aircraft or vehicle hybrid component, produced by the process of claim 2.

7. The process of claim 1, wherein the hotmelt adhesive comprises 4% to 6% of the blocked isocyanate and 4% to 7.5% of the epoxide.

8. The process of claim 7, wherein the functionalized polyolefin is based on polypropylene, ethylene and at least one $C_3$ to $C_{12}$ α-olefin copolymer.

9. The process of claim 7, wherein
the metal component is partially or entirely coated with the hotmelt adhesive,
coating occurs with an electrostatic spray gun, a painting system, or both; and
the metal component is heated at 150° C. for between 120 to 300 seconds.

10. An aircraft or vehicle hybrid component, produced by the process of claim 7.

11. The process of claim 1, wherein the functionalized polyolefin is based on polypropylene, ethylene and at least one $C_3$ to $C_{12}$ α-olefin copolymer.

12. The process of claim 1, wherein
the metal component is partially or entirely coated with the hotmelt adhesive,
coating occurs with an electrostatic spray gun, a painting system, or both; and
the metal component is heated at 150° C. for between 120 to 300 seconds.

13. An aircraft or vehicle hybrid component, produced by the process of claim 1.

* * * * *